(12) United States Patent
Kismarton (10) Patent No.: US 7,157,663 B1
(45) Date of Patent: Jan. 2, 2007

(54) CONDUCTING-FIBER DEICING SYSTEMS AND METHODS

(75) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/248,501

(22) Filed: Oct. 12, 2005

(51) Int. Cl.
*H05B 3/10* (2006.01)

(52) U.S. Cl. .................. 219/201; 219/548; 244/134 R; 428/220

(58) Field of Classification Search .............. 219/201, 219/535, 529, 544, 549, 543, 548; 244/134 E, 244/123, 133, 134 D, 134 R
See application file for complete search history.

(56) References Cited

U.S. PATENT DOCUMENTS

| | | | |
|---|---|---|---|
| 2,884,509 A | 4/1959 | Heath | |
| 3,146,340 A | 8/1964 | Dewey, II et al. | |
| 3,178,560 A | 4/1965 | Mapp et al. | |
| 4,301,356 A | 11/1981 | Tanei et al. | |
| 4,737,618 A | 4/1988 | Barbier et al. | |
| 4,741,499 A | 5/1988 | Rudolph et al. | |
| 5,088,277 A | 2/1992 | Schulze | |
| 5,344,696 A | 9/1994 | Hastings et al. | |
| 5,863,667 A | 1/1999 | Poggi | |
| 5,925,275 A * | 7/1999 | Lawson et al. | 219/543 |
| 5,947,418 A | 9/1999 | Bessiere et al. | |
| 5,971,323 A | 10/1999 | Rauch et al. | |
| 6,015,965 A | 1/2000 | Miller et al. | |
| 6,018,141 A | 1/2000 | Miller et al. | |
| 6,031,214 A | 2/2000 | Bost et al. | |
| 6,126,061 A | 10/2000 | Poggi | |
| 6,137,083 A | 10/2000 | Bost et al. | |
| 6,145,787 A | 11/2000 | Rolls | |
| 6,194,685 B1 | 2/2001 | Rutherford | |
| 6,227,492 B1 * | 5/2001 | Schellhase et al. | 244/134 D |
| 6,237,874 B1 | 5/2001 | Rutherford et al. | |
| 6,279,856 B1 | 8/2001 | Rutherford et al. | |
| 6,330,986 B1 | 12/2001 | Rutherford et al. | |
| 6,467,730 B1 | 10/2002 | Laugt | |
| 6,696,674 B1 | 2/2004 | Doornsbosch | |
| 6,832,742 B1 | 12/2004 | Petrenko et al. | |
| 6,870,139 B1 | 3/2005 | Petrenko | |
| 2005/0189345 A1 * | 9/2005 | Brunner et al. | 219/548 |

* cited by examiner

*Primary Examiner*—Quang Van
(74) *Attorney, Agent, or Firm*—Lee & Hayes, PLLC (57) ABSTRACT

Conducting-fiber deicing systems and methods. In one embodiment, an assembly includes a surface subject to an accumulation of ice, the surface at least partially including a heating portion having a layer of multi-directional electrically-conductive fibers formed between first and second non-electrically conductive layers. The layer of electrically-conductive fibers is coupled to a power supply member and is adapted to conduct an electrical current such that the layer of electrically-conductive fibers, and at least one of the first and second non-electrically conductive layers of the heating portion, are raised to an elevated temperature to at least partially inhibit the accumulation of ice on the surface.

21 Claims, 6 Drawing Sheets

CONDUCTING-FIBER DEICING SYSTEMS AND METHODS

GOVERNMENT LICENSE RIGHTS

This invention was made with Government support under contract number MDA972-98-9-0004 awarded by the Defense Advanced Research Projects Agency. The Government has certain rights in this invention.

CROSS REFERENCE TO RELATED APPLICATIONS

This patent application is related to co-pending, commonly-owned U.S. patent application No. (t.b.d.) entitled "Apparatus and Methods for Fabrication of Composite Components" filed concurrently herewith on Oct. 12, 2005, which application is incorporated herein by reference.

FIELD OF THE INVENTION

This invention relates to systems and methods for preventing or removing ice accumulation on a surface, and more specifically, to conducting-fiber deicing systems and methods for use on, for example, leading edges of rotor blades, wings, and other surfaces of aircraft, or any other surfaces that require deicing.

BACKGROUND OF THE INVENTION

A variety of deicing systems and methods are known for preventing and/or removing unwanted buildup of ice on the leading edges of wings, rotor blades, and other surfaces of aircraft. Some conventional systems rely on hot air flowing through ducts within the leading edge to perform the desired ice removal, such as those systems disclosed in U.S. Pat. No. 6,467,730 B2 issued to Laugt, U.S. Pat. No. 5,088,277 issued to Schulze, and U.S. Pat. No. 4,741,499 issued to Rudolph et al. Alternately, the desired deicing may be performed by electrically-heated conducting fibers as disclosed, for example, in U.S. Pat. No. 4,737,618 issue to Barbier et al. Although desirable results have been achieved using such conventional deicing systems, there may be room for improvement.

SUMMARY OF THE INVENTION

The present invention is directed to conducting-fiber deicing systems and methods. Embodiments of systems and methods in accordance with the present invention may be lighter than prior art systems, may provide more uniform heating, and may be more reliable, robust, and durable than prior art systems.

In one embodiment, an assembly includes a surface subject to an accumulation of ice, the surface at least partially including a heating portion having a layer of multi-directional electrically-conductive fibers formed between first and second non-electrically conductive layers. The layer of electrically-conductive fibers is coupled to a power supply member and is adapted to conduct an electrical current such that the layer of electrically-conductive fibers and at least one of the first and second non-electrically conductive layers of the heating portion are raised to an elevated temperature to at least partially inhibit the accumulation of ice on the surface.

BRIEF DESCRIPTION OF THE DRAWINGS

Embodiments of the present invention are described in detail below with reference to the following drawings.

DETAILED DESCRIPTION

The present invention relates to conducting-fiber deicing systems and methods. Many specific details of certain embodiments of the invention are set forth in the following description and in FIGS. 1–12 to provide a thorough understanding of such embodiments. The present invention may have additional embodiments, or may be practiced without one or more of the details described below.

In the following discussion, the term "deicing" is used to generally refer to systems and methods that may remove, partially remove, partially prevent (or inhibit), and completely prevent the formation of ice on a surface. Thus, it should be understood that deicing systems and methods in accordance with the invention may be used to remove or partially remove ice from a surface after the ice has already accumulated (e.g. on a rotor blade of a rotary aircraft), as well as to inhibit the formation of ice on a surface upon which ice has not yet accumulated (e.g. on a wing surface of a fixed-wing aircraft).

Figure 1:
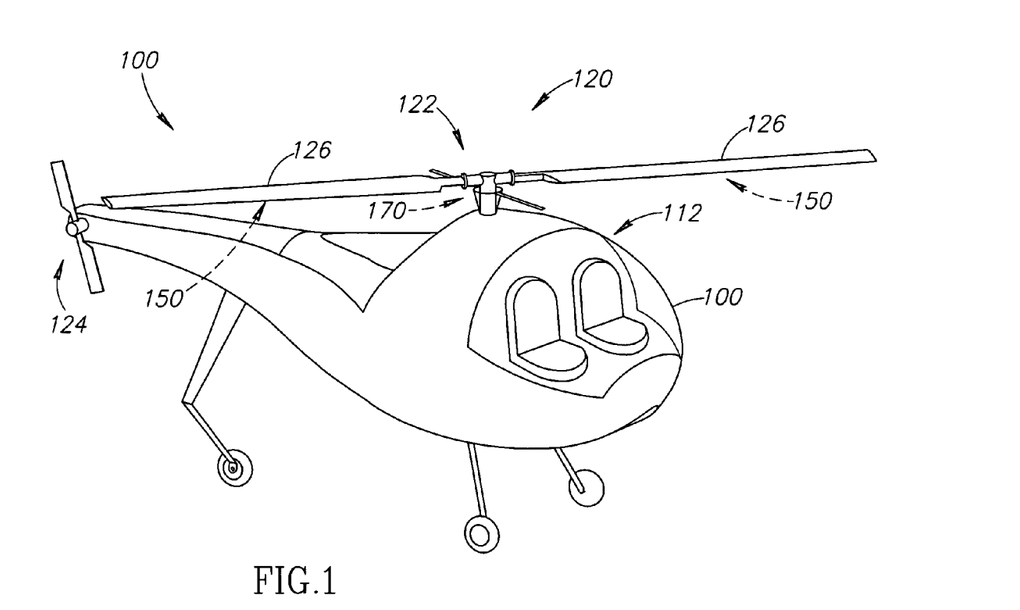
FIG. 1 is an isometric view of a rotary aircraft having a deicing system in accordance with an embodiment of the invention.

FIG. 1 is an isometric view of a rotary aircraft 100 in accordance with an embodiment of the invention. In this embodiment, the aircraft 100 includes a fuselage 110 and a rotary lift and propulsion system 120 having a main rotor assembly 122 and a tail rotor assembly 124. The main rotor assembly 122 includes a pair of rotor blades 126 each having a deicing system 150 in accordance with an embodiment of the invention. The aircraft 100 may include a cockpit 112 disposed in a forward portion of the fuselage 110 for manned operations. In alternate embodiments, however, the cockpit 112 may be eliminated.

Figure 2:
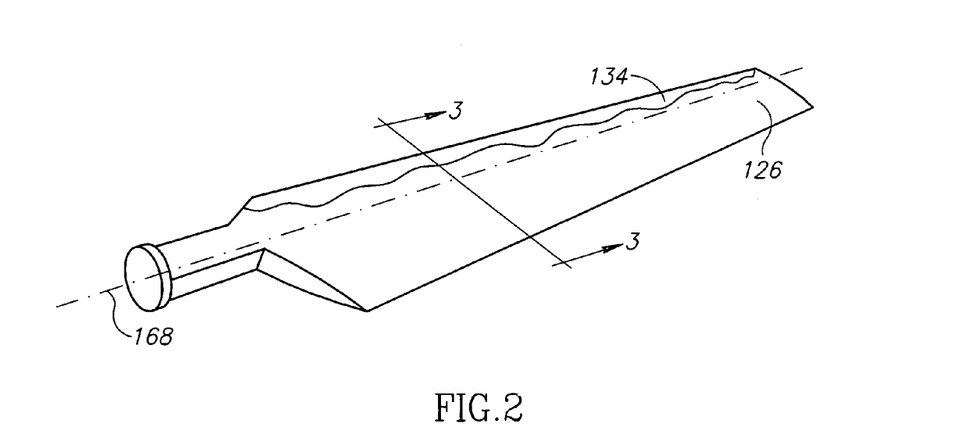
FIG. 2 is an isometric view of a rotor blade of the rotary aircraft of FIG. 1.
Figure 3:
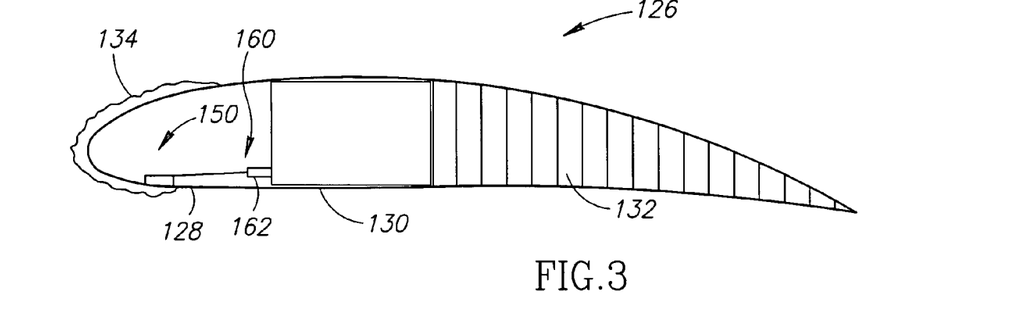
FIG. 3 is a cross-sectional view of the rotor blade of FIG. 2 in accordance with an embodiment of the invention.
Figure 4:
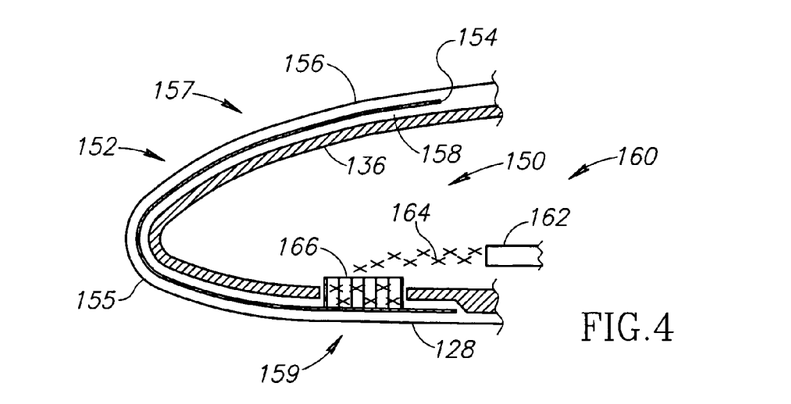
FIG. 4 is an enlarged partial cross-sectional view of the rotor blade of FIG. 2.

FIG. 2 is an isometric view of one of the rotor blades 126 of FIG. 1. FIGS. 3 and 4 are cross-sectional views of the rotor blade 126 of FIG. 2. In this embodiment, the rotor blade 126 includes a leading edge portion 128 that contains the deicing system 150, a central load-bearing portion 130 (FIG. 3) that may include, for example, a box beam or other suitable structural member, and a trailing edge portion 132 that may include, for example, a honeycomb structure. As depicted in FIGS. 2 and 3, a layer of ice 134 may form on the leading edge portion 128 of the rotor blade 126 during operation of the rotor blade 126, necessitating the use of the deicing system 150 as described more fully below.

FIG. 4 is an enlarged, cross-sectional view of the leading edge portion 128 of the rotor blade 126 of FIG. 3. In this embodiment, the leading edge portion 128 includes an inner structural layer 136 that may be formed of any suitable material, including, for example, a metal or a carbon-fiber composite material. A heating portion 152 of the deicing system 150 is formed on an outer surface of the structural layer 136. The heating portion 152 includes a conductive fiber element 154 disposed between a first non-electrically conductive (or insulative) layer 156 and a second non-electrically conductive layer 158. The conductive fiber element 154 may include any suitable type of electrically-conducting fibers, and the first and second non-electrically conductive layers 156, 158 may be formed of any suitable insulative materials. The first non-electrically conductive layer 156 may serve as the outermost surface of the leading edge portion 128 (e.g. upon which the ice 134 may begin to form), and provides protection to the conductive fiber element 154. In alternate embodiments, one or more additional layers may be added onto the first non-electrically conductive layer 156 so that the ice 134 forms on the outermost one of such additional layers. The second non-electrically conductive layer 158 provides an electrically-insulative barrier between the conductive fiber element 154 and surrounding portions of the rotor blade 126.

In one particular embodiment, for example, the conductive fiber element 154 includes a mat of graphite fibers, the mat having a thickness of approximately 0.002 inches, the fibers (e.g. approximately a thousand or more) being disposed multi-directionally (or omni-directionally) throughout the conductive fiber element 154, and the first and second non-electrically conductive layers 156, 158 are formed of a fiberglass composite. In alternate embodiments, for example, the conductive fiber element 154 may include metal fibers, or any other suitable conductive fibers. Furthermore, the extent of the conductive fiber element 154 may be greater than or less than the particular embodiment shown in FIG. 4. In one particular embodiment, for example, the conductive fiber element 154 may extend from a stagnation point 155 of the rotor blade 126 approximately 10% to 30% of a chord length of the rotor blade 126 along an upper portion 157 of the rotor blade 126, and approximately 20% to 60% of the chord length along a lower portion 159 of the rotor blade 126. Of course, in alternate embodiments, the conductive fiber element 154 may extend greater or lesser amounts along the upper and lower portions 157, 159 of the rotor blade 126.

As further shown in FIG. 4, in this embodiment, the deicing system 150 further includes a power supply member 160 that passes through the inner structural layer 136 and the second non-electrically conductive layer 158 and couples to the conductive fiber element 154 of the heating portion 152. In one particular embodiment, the power supply member 160 includes a primary portion 162 (e.g. a cable, a wire, etc.), and a secondary portion 164 coupled between the primary portion 162 and the conductive fiber element 154. The secondary portion 164 may be more flexible than the primary portion 162. As shown in FIG. 4, in one particular embodiment, the secondary portion 164 includes a braided conductor (or braided ribbon) that is coupled to the conductive fiber element 154 using an electrically-conductive epoxy 166. The flexibility of the secondary portion 164 may advantageously reduce fatigue and failure of the coupling between the power supply member 160 and the conductive fiber element 154, particularly for deicing systems that must operate within harsh environments that are subject to extreme vibrations (e.g. within rotor blades of rotary aircraft). The primary portion 162 of the power supply member 160 may extend along a longitudinal axis 168 of the rotor blade 126 (FIG. 2), such as along the central load-bearing portion 130 as shown in FIG. 3, and may receive electrical power from, for example, a conventional slip ring device 170 (FIG. 1) of the main rotor assembly 120.

Figure 5:
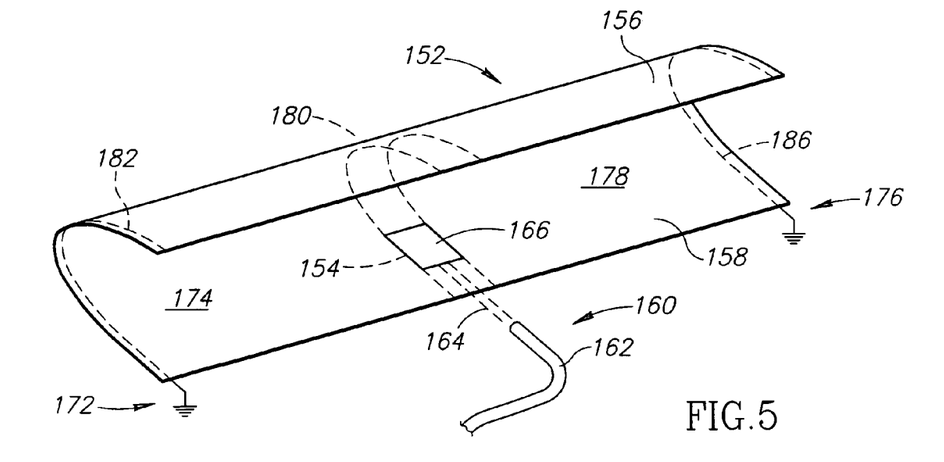
FIG. 5 is an isometric view of a heating element of the rotor blade of FIG. 2.

FIG. 5 is an isometric view of the deicing system 150 of the rotor blade 126 of FIG. 2. In operation, electrical power is provided through the power supply member 160 into the conductive fiber element 154 of the heating portion 152. The conductive fiber element 154 may be electrically grounded through a first grounding location 172, thereby completing an electrical circuit across a first portion 174 of the conductive fiber element 154. The flow of current through the conductive fiber element 154 between the coupling point with the power supply element 160 and the first grounding location 172 causes heating of the first portion 174 of the conductive fiber element 154. In turn, a corresponding first portion 174 of the first non-electrically conductive layer 156 of the heating portion 152 is heated in order to remove the ice 134. The first grounding location 172 may then be electrically decoupled, and a second grounding location 176 may be electrically coupled to complete the electrical circuit over a second portion 178 of the conductive fiber element 154.

As shown in FIG. 5, in an alternate embodiment, the power supply element 160 may be coupled to the conductive fiber element 154 along an engagement area 180 rather than at a single location (as shown in FIG. 4). The engagement area 180 may span across the entirety of the conductive fiber element 154 (FIG. 5). Similarly, the first and second grounding locations 172, 176 may include grounding strips 182, 186 that span across the entirety of the conductive fiber element 154. As depicted in FIG. 5, the grounding strips 182, 186 may be approximately parallel with the engagement area 180. Thus, the flow of electrical current between the engagement area 180 and the first and second grounding strips 182, 186 may provide improved uniformity of the heating of the first and second portions 174, 178 of the conductive fiber element 154. The amount of electrical power provided to the conductive fiber element 154 may vary depending upon several factors, including the size of the conductive fiber element 154 and the operating conditions of the rotor blade 126. In one particular embodiment, the amount of electrical power provided to the conductive fiber element 154 results in a power density of approximately 20 to 30 Watts per square inch across the respective first and second portions 174, 178 of the conductive fiber element 154. Alternately, enough electrical power may be provided to loosen the ice 134 which may have formed on the heating portion 152, causing the ice 134 to be cast off of the rotating rotor blade 126 by centrifugal forces. In one particular embodiment, for example, enough electrical energy may be provided to melt a lower portion of the ice 134 approximately 0.001 to 0.003 inches in thickness, thereby allowing the ice 134 to become loosened and to "slip off" or to otherwise be removed by centrifugal forces.

Embodiments of the present invention may provide significant advantages over the prior art. For example, systems and methods in accordance with the present invention may be lighter than prior art systems, particularly those systems that rely upon heated air flowing through ducts. Embodiments of the present invention may also provide more uniform heating over the leading edge portion in comparison with the prior art, thereby making ice removal (or prevention) more effective. Embodiments of the present invention may also be more reliable, robust, and durable than prior art systems, including prior art systems that rely upon conductive fibers.

Figure 6:
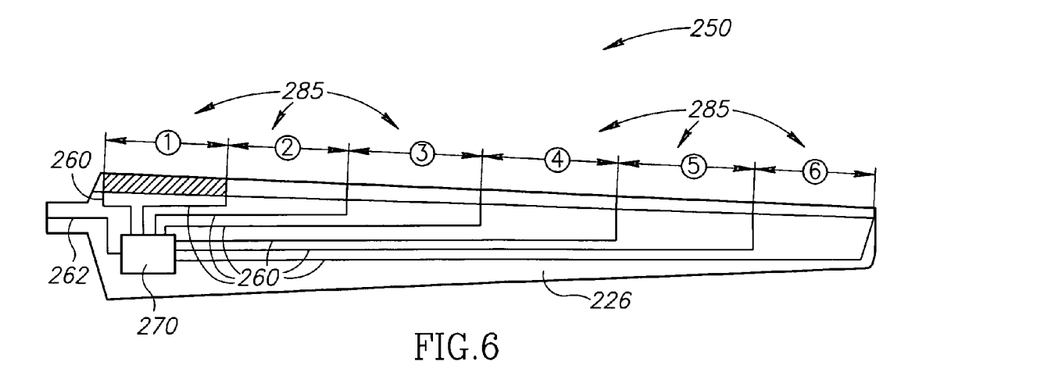
FIG. 6 is a top elevational view of a rotor blade having a deicing system in accordance with an alternate embodiment of the invention.

It will be appreciated that a variety of alternate embodiments may be conceived in accordance with the teachings of the present disclosure, and that the invention is not limited to the particular embodiments described above and shown in FIGS. 1 through 5. For example, FIG. 6 is a top elevational view of a rotor blade 226 in accordance with an alternate embodiment of the invention. In this embodiment, the rotor blade 226 includes a deicing system 250 having a plurality of heating zones 285 distributed along the leading edge portion 228. In the embodiment shown in FIG. 6, the deicing system 250 includes six heating zones 285. The deicing system 250 includes a conductive fiber element 254, and a plurality of conductive members 260 coupled to the conductive fiber element 254 at various locations along a longitudinal axis 268 of the rotor blade 226. The heating zones 285 are defined by the attachment locations (or attachment bands as described above with respect to FIG. 5) of the conductive members 260 to the conductive fiber element 254. A controller 270 is coupled to the plurality of conductive members 260 and to a power supply member 262.

Figure 7:
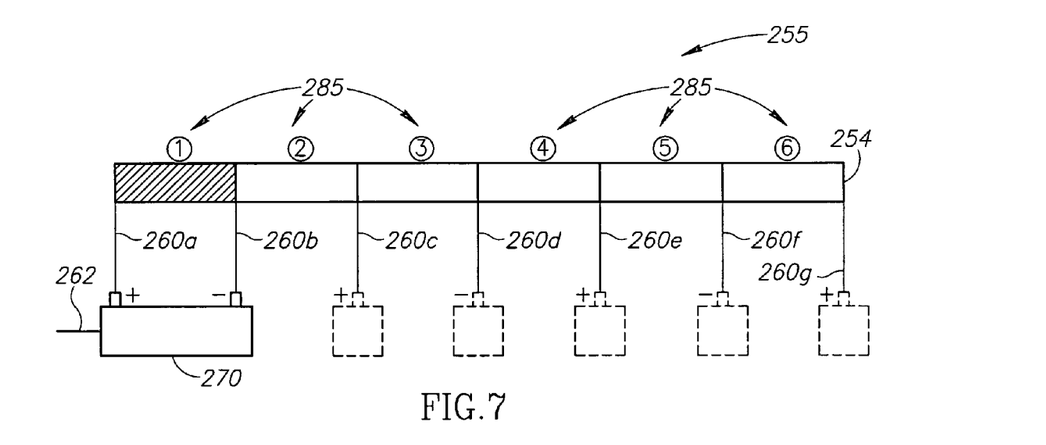
FIG. 7 is a circuit diagram of a deicing system of the rotor blade of FIG. 6.

FIG. 7 is a circuit diagram 255 of the deicing system 250 of FIG. 6. In operation, the controller 270 selectively switches electrical power from the power supply member 262 across one or more of the heating zones 285 to effect the desired ice removal from the rotor blade 226. In one particular embodiment, the controller 270 initially provides electrical power to the outermost heating zone 285 (i.e. heating zone 6 in FIGS. 5 and 6) for a sufficient period of time to loosen an accumulation of ice that may have formed on this heating zone 285, allowing the accumulation of ice to be removed by centrifugal forces due to the rotating rotor blade 226. The controller 270 then removes the electrical power from the outermost heating zone 285 (heating zone 6) and provides power to the next adjacent heating zone 285 in the inboard direction (heating zone 5) for a sufficient period of time to loosen an accumulation of ice that may have formed on this heating zone 285 and allowing the accumulation of ice to be removed by centrifugal forces. The controller 270 and then continues in this manner to successively provide electrical power to the heating zones 285 until the accumulation of ice is removed from the innermost heating zone 285 (i.e. heating zone 1), and then the process may be repeated as necessary.

Although particular embodiments of deicing systems and methods have been described above in association with rotor blades of rotary aircraft, it will be appreciated that in alternate embodiments, deicing systems and methods in accordance with the present invention may be employed in a wide variety of other applications. For example, embodiments of the deicing systems and methods may be employed within wings, fuselages, tail portions, and control surfaces (e.g. fins, canards, etc.) of aircraft and other aerospace vehicles, or on any other desired surfaces that may require deicing.

Figure 8:
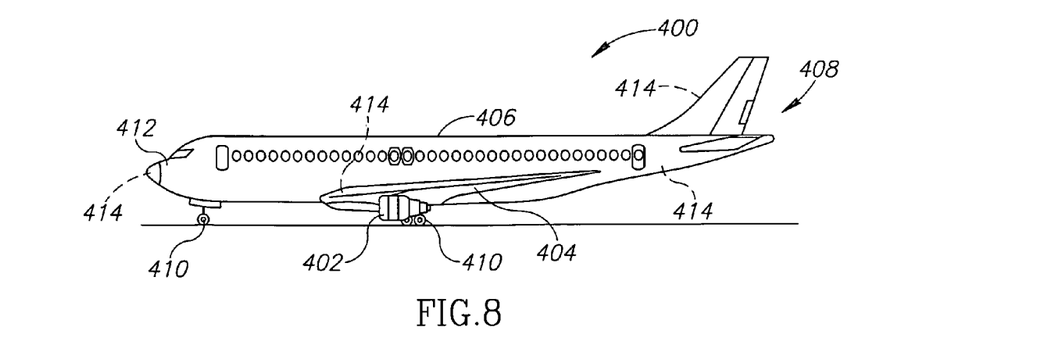
FIG. 8 is a side elevational view of an aircraft having a deicing system in accordance with yet another embodiment of the invention.

For example, FIG. 8 is a side elevational view of an aircraft 400 having a plurality of deicing (or anti-icing) systems 414 in accordance with yet another embodiment of the invention. The aircraft 400 generally includes one or more propulsion units 402 that are coupled to wing assemblies 404, or alternately, may be coupled to a fuselage 406 or even other portions of the aircraft 400. Additionally, the aircraft 400 includes a tail assembly 408 and a landing assembly 410 coupled to the fuselage 406, and a flight control system 412. The aircraft 400 further includes a variety of generally known components, systems, and subsystems that cooperatively perform a variety of tasks necessary for the operation of the aircraft 400, and which, in the interest of brevity, will not be described in detail. The aircraft 400 further includes a plurality of deicing systems 414 in accordance with the present invention. In this embodiment, the deicing systems 414 may be disposed within the wing assemblies 404, the tail assembly 408, and within selected portions of the fuselage 406.

The aircraft 400 shown in FIG. 8 is generally representative of a commercial passenger aircraft, including, for example, the 737, 747, 757, 767 and 777 commercial passenger aircraft available from The Boeing Company of Chicago, Ill. In alternate embodiments, however, deicing systems and methods in accordance with the present invention may be incorporated into any other desired vehicles. Examples of such vehicles include other commercial aircraft, manned or unmanned military aircraft, rotary wing aircraft, or other types of flight vehicles, as illustrated more fully in various descriptive volumes, such as Jane's All The World's Aircraft, available from Jane's Information Group, Ltd. of Coulsdon, Surrey, UK.

Figure 9:
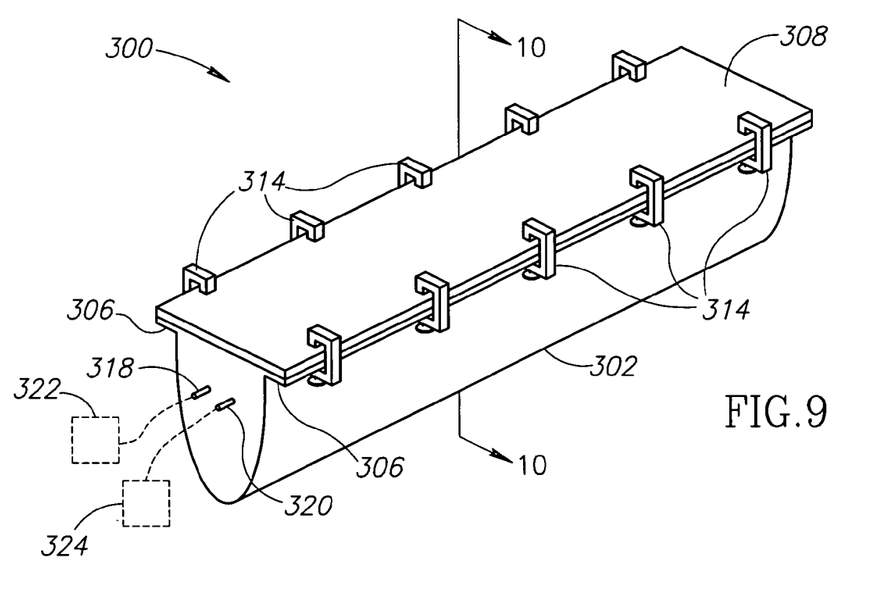
FIG. 9 is an isometric view of a system for manufacturing composite components in accordance with an alternate embodiment of the invention.
Figure 10:
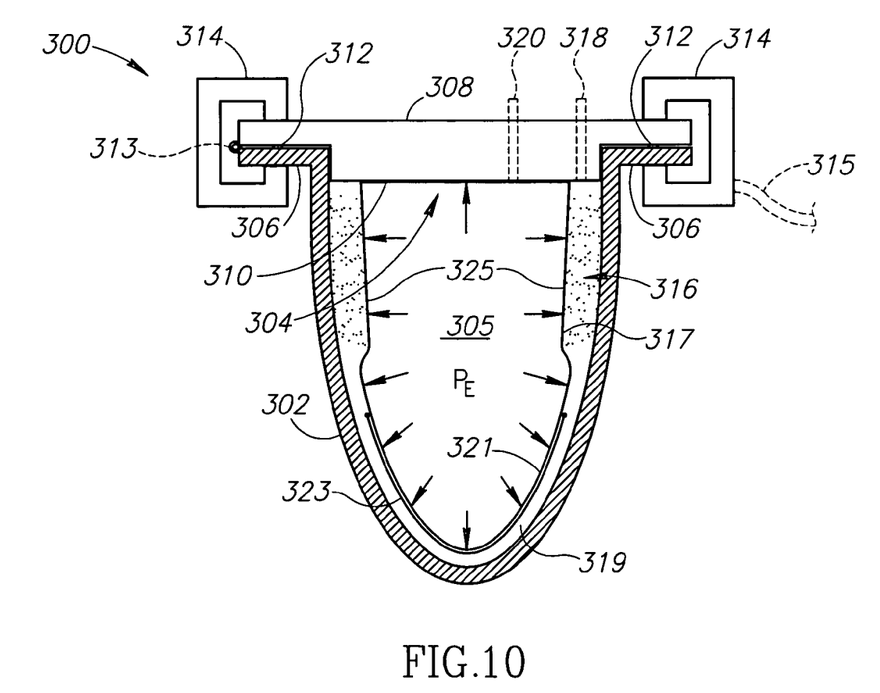
FIG. 10 is a cross-sectional view of the system of FIG. 9.

FIG. 9 is an isometric view of a system 300 for manufacturing composite components in accordance with an embodiment of the invention. FIG. 10 is a cross-sectional view of the system 300 of FIG. 9 taken along line 10—10. In this embodiment, the system 300 includes a containment member 302 having an opening 304 (FIG. 10) leading to an internal volume 305, and flanges 306 extending outwardly from opposing sides proximate the opening 304. A lid member 308 is positioned on the containment member 302, and includes an insertion portion 310 (FIG. 10) that fittingly engages within the opening 304 of the containment member 302. One or more seals 312 (FIG. 10) are disposed around the opening 304 between the containment member 302 and the lid member 308, and a plurality of clamps (or locking devices) 314 secure the lid member 308 to the flanges 306 of the containment member 302.

As shown in FIG. 10, an expandable member (or bladder) 317 is positioned within the internal volume 305 of the containment member 302. The expandable member 317 may be formed of silicone, or any other suitable material. A composite material 316 is formed at least partially around the expandable member 317, and is positioned between the expandable member 317 and the containment member 302. In alternate embodiments, the composite material 316 may also be positioned between the expandable member 317 and the lid member 308. In some embodiments, the composite material 316 may be formed using successive layers of a fiber-containing resinous material. For example, in alternate embodiments, the fibers within the composite material 316 may include glass, graphite, or polymeric fibers, and the resinous material may include phenolic, epoxy, or bismaleimide resins. Of course, in other embodiments, any suitable materials may be used.

In this embodiment, the composite material 316 includes a first composite portion (or layer) 319, a second composite portion (or layer) 321, and a pair of relatively thicker third composite portions (or layers) 325 coupled to the first and second composite portions 319, 321. A conductive-fiber layer 323 is formed between the first and second composite portions 319, 321. Thus, the composite material 316 may be an alternate embodiment of a component that includes a conductive-fiber de-icing system, such as a leading edge portion of a rotor blade or other aircraft component, including the leading edge portion 128 of the rotor blade 126 described above and shown in FIGS. 3 through 5.

As further shown in FIG. 9, a first port 318 is disposed through the containment member 302 and is in fluid communication with the internal volume 305 of the containment member 302, and more specifically, with the space between the expandable member 317 and the containment and lid members 302, 308. A second port 320 is also disposed through the containment member 302 and is in fluid communication with the interior of the expandable member 317. A vacuum source 322 may be coupled to the first port 318, and a pressure source 324 may be coupled to the second port 320. As shown in FIG. 10, in alternate embodiments, one or both of the first and second ports 318, 320 may be disposed through the lid member 308, depending on the particular configuration of the composite component 316. In further embodiments, a plurality of first and second ports 318, 320 may be provided and distributed over both the lid and containment members 308, 302.

It will be appreciated that alternate embodiments of systems for fabricating composite components may be conceived, and that the invention is not limited to the particular embodiments described above and shown in FIGS. 9 and 10. For example, in alternate embodiments, the cross-sectional shape of the containment member 302, the lid member 308, and the composite component 316 is not limited to the particular embodiment shown in FIGS. 9 and 10. Composite components having a variety of different cross-sectional shapes may be formed using embodiments of the present invention. Also, the cross-sectional shape of the composite components may remain constant or may vary along the length of the containment member 302. Furthermore, alternate schemes for securing the lid member 308 to the containment member 302 may be conceived, and the invention is not limited to the mechanical clamps 314 shown in FIGS. 9 and 10. For example, as shown in FIG. 10, in alternate embodiments a hinge 313 may be used to replace (or supplement) the clamps 314 along one edge portion of the system 300. In further embodiments, one or more of the clamps (or locking devices) 314 may be coupled to a supply line 315 (FIG. 10) that provides a hydraulic (or pneumatic) flow to drive the locking device 314, thereby locking the lid member 308 in a closed position. The locking device 314 may be a separate component from the containment and lid members 302, 308, or alternately, may be integrally-formed with at least one of the containment and lid members 302, 308. In further embodiments, the locking device 314 may be any suitable type of device that secures the lid member 308 in the closed position, including an electrical device, a hydraulic device, a pneumatic device, a magnetic device, a mechanical device, or any other desired type of locking mechanism.

Figure 11:
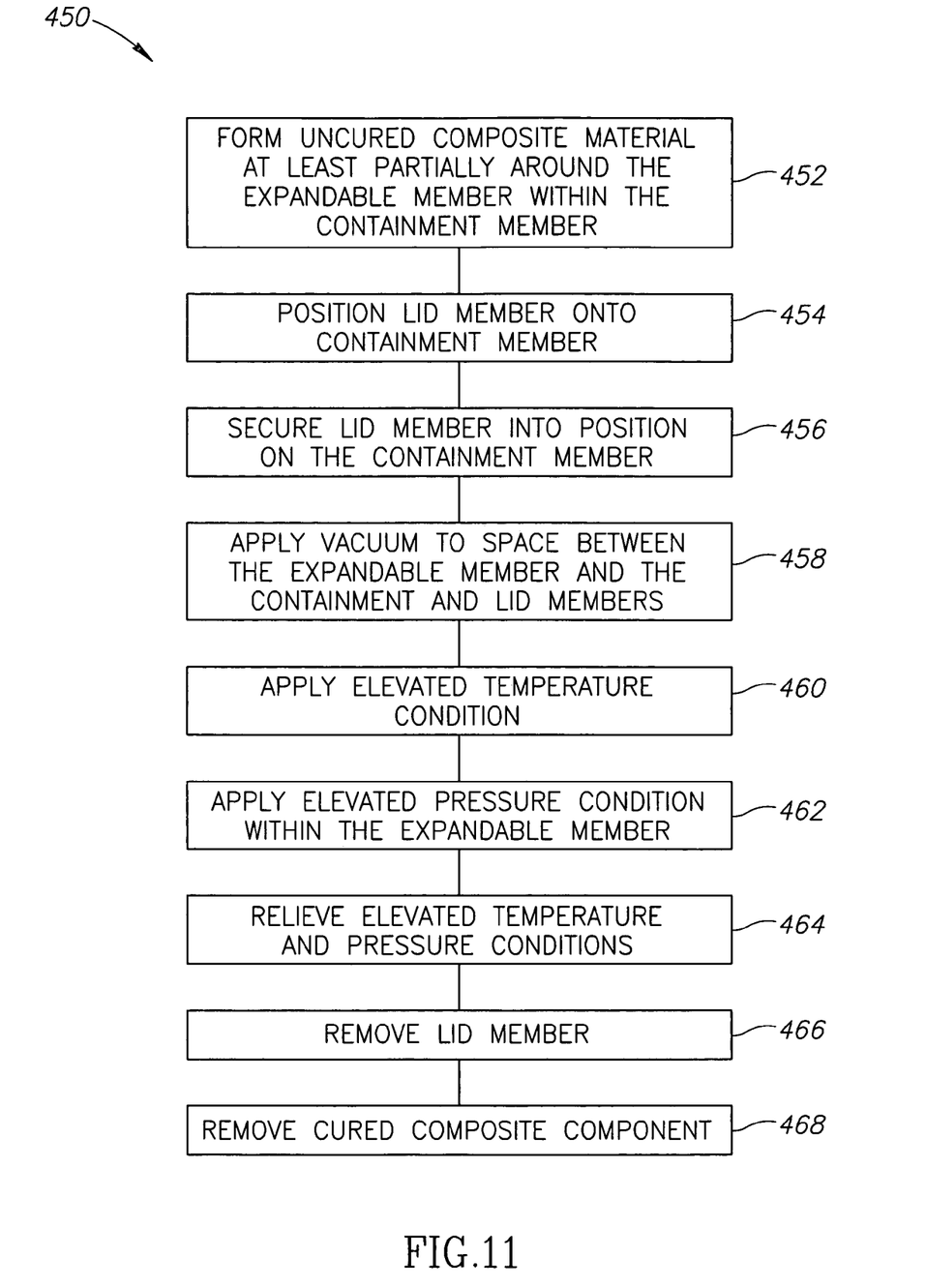
FIG. 11 is a flow chart of a method of fabricating composite components in accordance with yet another embodiment of the invention.

FIG. 11 is a flow chart of a method 450 of fabricating composite components in accordance with yet another embodiment of the invention. As shown in FIG. 11, the method 450 includes forming the uncured composite material at least partially around the expandable member 317 within the containment member 302 at a block 452. For example, in one particular embodiment, an approximately "U-shaped" or lower portion of uncured composite material 316 may be formed on the inner surfaces of the containment member 302, the expandable member 317 may be positioned within the "U-shaped" or lower portion, and a second, relatively flat portion of uncured composite material may then formed over the expandable member 317 (in the space between the expandable member 317 and the lid member 308). At a block 454, the lid member 308 is positioned onto the containment member 302 with the insertion portion 310 fittingly engaged into the opening 304 of the containment member 302. The lid member 308 is secured to the containment member 302 at a block 456. For example, in one embodiment, the clamps (or locking devices) 314 are used to clamp the lid member 308 to the flanges 306 of the containment member 302.

At a block 458, a vacuum is applied to the space between the expandable member 317 and the containment and lid members 302, 308 (or to the space occupied by the composite material 316). More specifically, the vacuum source 322 is used to pull vacuum through the first port 318, evacuating the space around the uncured composite material 316. At a block 460, an elevated temperature $T_E$ is applied to the system 300, such as by installing the system 300 into an oven. At a block 462, an elevated pressure $P_E$ is applied within the expandable member 317 (as depicted by the outwardly directed arrows), such as by providing a pressurized gas or fluid from the pressure source 324 through the second port 320. The elevated temperature and pressure conditions $T_E$, $P_E$ may be applied (blocks 460, 462) for one or more periods as desired to suitably cure the composite material 316 within the system 300. Next, at a block 464, the elevated temperature and pressure conditions $T_E$, $P_E$ are relieved, and the lid member 308 is removed at a block 466. The cured composite component 316 is then removed from the system 300 at a block 468.

Because in some embodiments, the containment member 302 and the lid member 308 may be heated and cooled with the composite component 316 engaged within the internal volume 305, it may be desirable that containment and lid members 302, 308 have coefficient of thermal expansion characteristics that are very similar to that of the composite component 316. In one particular embodiment, for example, the containment and lid members 302, 308 may be formed of a Nickel-containing steel alloy commonly referred to as Invar steel and known for its relatively low thermal expansion coefficient. Alternately, the containment and lid members 302, 308 may be formed of aluminum, steel, titanium, or any other suitable materials. With continued reference to FIG. 11, in alternate embodiments of methods in accordance with the present invention, the cured composite component may be removed from the containment member (block 468) prior to the relieving of the elevated temperature condition (block 464) to prevent damage to the cured composite component by the differential thermal expansion/contraction during cooling of the containment and lid members 302, 308.

Figure 12:
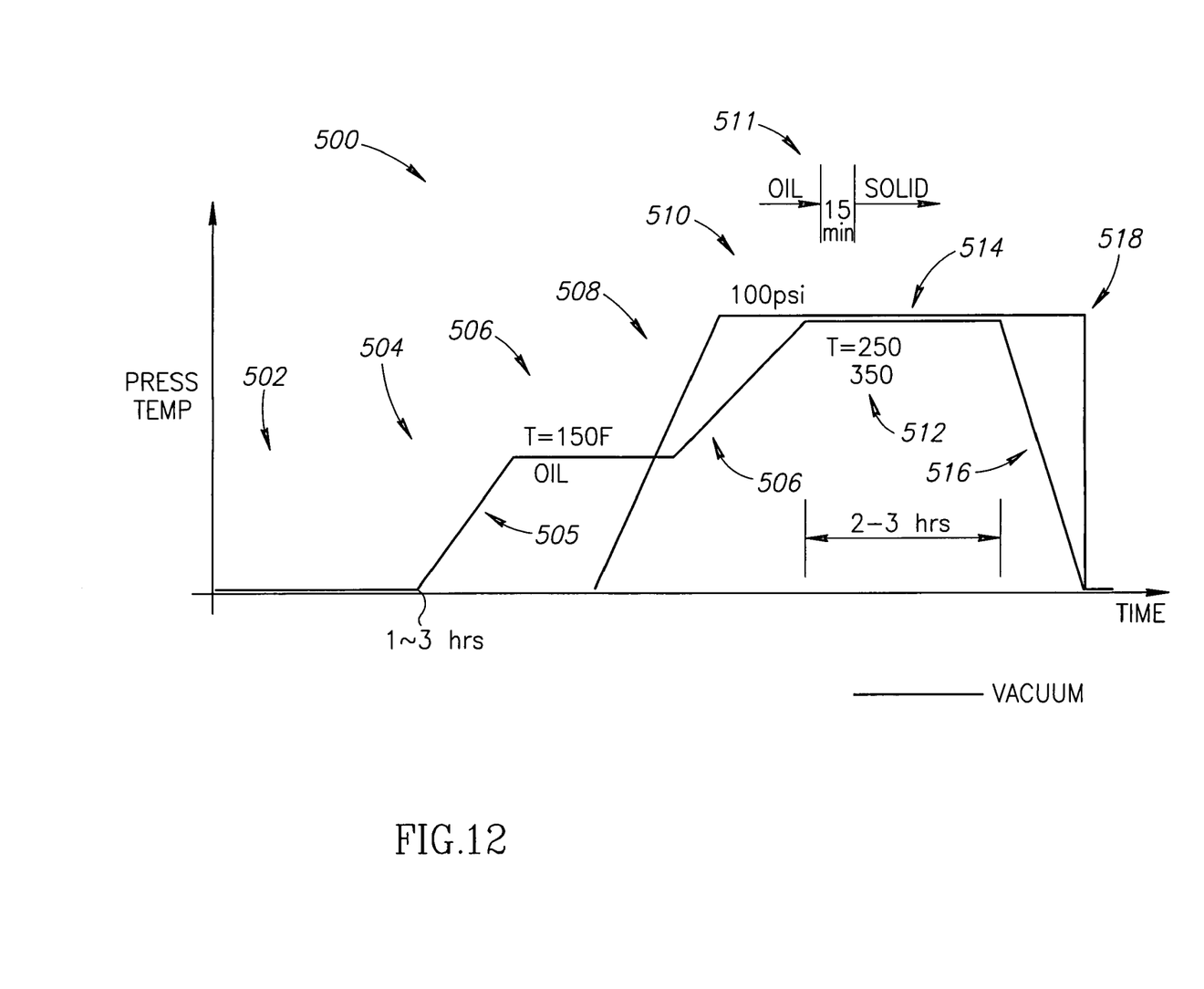
FIG. 12 is a representative curing cycle for curing a composite component using a system in accordance with another embodiment of the invention.

It will be appreciated that the values and durations of the elevated temperature $T_E$ and the elevated pressure $P_E$ conditions that are applied during the curing of the composite component (blocks 460, 462) may vary depending on the particular design features of the composite component being formed, including the resinous materials and fiber materials contained in the uncured composite material. For example, FIG. 12 is a representative curing cycle 500 for curing a composite component within the system 300 of FIG. 9 in accordance with another embodiment of the invention. In this embodiment, the curing cycle 500 includes a first portion 502 of approximately 1 to 3 hours in duration wherein vacuum is applied to the volume containing the uncured composite material, prior to the elevation of the temperature and pressure within the system 100. During a second portion 504 of the curing cycle 500, the vacuum continues to be applied while the temperature of the system 100 is gradually elevated from a non-elevated temperature level to a first temperature level (e.g. approximately 150° F.) and maintained at that level for a first period of time.

During a third portion 506, with the vacuum applied and the temperature maintained at the first temperature level, the pressure within the expandable member 217 begins to be increased from a non-elevated pressure level. At some point, typically during the second or third portions 504, 506 of the curing cycle 500, a resinous portion of the uncured composite material undergoes a first phase change 505 from a first solid state to an oil (or liquid or semi-liquid) state. As the pressure continues to be increased within the expandable member 217, the temperature of the system 100 begins increasing again during a fourth portion 508 of the curing cycle 500. During a fifth portion 510 of the curing cycle 500, the pressure reaches a first elevated pressure level (e.g. approximately 100 psi) and is held constant at that level while the temperature continues to increase to a second elevated temperature level (e.g. between approximately 250° F. to 350° F.).

During a sixth portion 512 of the curing cycle 500, the pressure is maintained at the first elevated pressure level and the temperature is maintained at the second elevated temperature for a specified curing period (e.g. approximately 2 to 3 hours). At some point, typically during the sixth portion 512, the resinous portion of the composite material undergoes a second phase change 511 from the oil (or liquid or semi-liquid) state to a second solid state. Also, at a vacuum termination point 514 during the sixth portion 512 (e.g. approximately half way through the specified curing period) the vacuum is removed. During a seventh portion 516 of the curing cycle 500, the pressure within the expandable member 217 is maintained at the first elevated pressure level while the temperature of the system 100 is cooled to the non-elevated temperature level. Finally, with the temperature reduced to the non-elevated temperature level, the pressure is reduced to the non-elevated pressure level during an eighth portion 518 of the curing cycle 500.

It will be appreciated that embodiments of apparatus and methods for fabricating composite components in accordance with the present invention may provide significant advantages over the prior art. For example, because fabrication systems in accordance with the present invention utilize an expandable member to provide the desired pressure conditions on the composite component, and because the entire system may be installed into an oven that operates at normal ambient pressures to provide the desired temperature conditions, the need for a large autoclave may be reduced or eliminated. Also, the costs of pumps, vacuums, and heating systems used in embodiments of the invention may be substantially reduced in comparison with those systems used in prior art manufacturing assemblies. Thus, embodiments of the invention may significantly reduce the tooling costs associated manufacturing composite components in comparison with prior art manufacturing systems. In some embodiments, for example, manufacturing systems in accordance with the invention may cost approximately two orders of magnitude less than prior art systems requiring an autoclave.

Embodiments of the invention may also improve the efficiency of the manufacturing process. For example, because the volumes that are pressurized within the expandable member may be substantially smaller than the volumes of prior art autoclaves, the portions of the manufacturing process that involve subjecting the composite components to an elevated pressure condition may be performed more quickly and efficiently in comparison with the prior art manufacturing processes.

While embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. An assembly, comprising:
   a non-planar surface subject to an accumulation of ice, the non-planar surface at least partially including a heating portion having a non-planar layer of multi-directional electrically-conductive fibers formed between first and second non-electrically conductive layers, the non-planar layer of electrically-conductive fibers being operatively coupled to a power supply member along a non-planar engagement area that spans across the non-planar layer of electrically-conductive fibers, the non-planar layer of electrically-conductive fibers being configured to conduct an electrical current such that the non-planar layer of electrically-conductive fibers and at least one of the first and second non-electrically conductive layers of the heating portion are raised to an elevated temperature to at least partially inhibit the accumulation of ice on the non-planar surface.

2. The assembly of claim 1, wherein the surface comprises a leading edge portion of an aerodynamically-shaped member.

3. The assembly of claim 1, wherein the surface comprises a leading edge portion of an aerodynamically-shaped member having a first portion and a second portion separated by a stagnation point, and wherein the heating portion extends at least partially along the first and second portions.

4. The assembly of claim 1, wherein the non-planar layer of electrically-conductive fibers comprises a concave layer that extends along a longitudinal direction, and wherein the non-planar engagement area comprises an approximately U-shaped cross-sectional portion of the longitudinally-extending concave layer.

5. The assembly of claim 4, wherein the layer of electrically-conductive fibers is further coupled to at least one grounding strip that spans across the layer of electrically-conductive fibers approximately parallel with the engagement area.

6. The assembly of claim 5, wherein the power supply member comprises a first braided conductive member and wherein the at least one grounding strip comprises a first grounding strip, the assembly further comprising a second grounding strip coupled to the layer of electrically-conductive fibers, the second grounding strip spanning across the layer of electrically-conductive fibers and being approximately parallel with the first grounding strip.

7. An assembly, comprising:
   an aerodynamically-shaped member having a leading edge portion including a non-planar outer surface subject to an accumulation of ice; and
   a deicing system operatively coupled to the aerodynamically-shaped member, the deicing system including a heating portion having a non-planar layer of multi-directional electrically-conductive fibers formed between first and second non-electrically conductive layers, the first non-electrically conductive layer at least one of forming a portion of the non-planar outer surface and being proximate to the non-planar outer surface, the non-planar layer of electrically-conductive fibers being operatively coupled to a power supply device along a non-planar engagement area that spans across the non-planar layer of electrically-conductive fibers, the non-planar layer of electrically-conductive fibers being configured to conduct an electrical current such that the non-planar layer of electrically-conductive fibers and the non-planar outer surface are raised to an elevated temperature to at least partially inhibit the accumulation of ice.

8. The assembly of claim 7, wherein the aerodynamically-shaped member comprises at least one of a rotor blade, a wing, a tail portion, and a control surface.

9. The assembly of claim 7, wherein the outer surface comprises a first portion and a second portion separated by a stagnation point, and wherein the heating portion extends at least partially along the first and second portions of the outer surface.

10. The assembly of claim 7, wherein the power supply member is coupled with a braided metal electrical cord to the engagement area.

11. The assembly of claim 7, wherein the power supply device comprises a plurality of conductive members operatively coupled to the layer of electrically-conductive fibers at a plurality of longitudinally spaced-apart engagement areas and defining a plurality of heating zones of the heating portion.

12. The assembly of claim 11, further comprising a controller operatively coupled to the plurality of conductive members and adapted to selectively provide independent electrical power to the plurality of heating zones.

13. The assembly of claim 12, wherein the plurality of heating zones are distributed along a longitudinal axis of the aerodynamically-shaped member, and wherein the controller is adapted to successively provide power to the plurality of heating zones from an outmost zone to an innermost zone.

14. An aircraft, comprising:
a fuselage including a wing assembly and a tail assembly;
a propulsion system operatively coupled to the fuselage; and
wherein at least one of the fuselage and the propulsion system includes:
an aerodynamically-shaped member having a leading edge portion including an outer surface subject to an accumulation of ice; and
a deicing system operatively coupled to the aerodynamically-shaped member, the deicing system including a heating portion having a non-planar layer of multi-directional electrically-conductive fibers formed between first and second non-electrically conductive layers, the first non-electrically conductive layer at least one of forming a portion of the outer surface and being proximate to the outer surface, the non-planar layer of electrically-conductive fibers being operatively coupled to a power supply device along a non-planar engagement area that spans across the non-planar layer of electrically-conductive fibers the non-planar layer of electrically-conductive fibers being configured to conduct an electrical current such that the non-planar layer of electrically-conductive fibers and the outer surface are raised to an elevated temperature to at least partially inhibit the accumulation of ice.

15. The aircraft of claim 14, wherein the aerodynamically-shaped member comprises at least one of a rotor blade, a wing, a tail portion, and a control surface.

16. The aircraft of claim 14, wherein the non-planar layer of electrically-conductive fibers comprises a concave layer that extends along a longitudinal direction, and wherein the non-planar engagement area comprises an approximately U-shaped cross-sectional portion of the longitudinally-extending concave layer.

17. The aircraft of claim 14, wherein the power supply device comprises a plurality of conductive members operatively coupled to the layer of electrically-conductive fibers at a plurality of longitudinally spaced-apart engagement areas and defining a plurality of heating zones of the heating portion, and a controller operatively coupled to the plurality of conductive members and adapted to selectively provide electrical power to the plurality of heating zones.

18. A method of deicing a surface, comprising:
providing a heating portion having a non-planar layer of multi-directional electrically-conductive fibers formed between first and second non-electrically conductive layers, the first non-electrically conductive layer at least one of forming a portion of the surface and being proximate to the surface; and
providing an electrical current through the non-planar layer of electrically-conductive fibers to raise a temperature of the surface to at least partially inhibit an accumulation of ice, wherein providing an electrical current includes providing an electrical current through a non-planar engagement area that spans across the non-planar layer of electrically-conductive fibers.

19. The method of claim 18, wherein providing a heating portion includes providing a heating portion having a layer of multi-directional electrically-conductive fibers coupled to a plurality of conductive members at a plurality of longitudinally spaced-apart engagement areas and defining a plurality of heating zones of the heating portion, and wherein providing an electrical current through the layer of electrically-conductive fibers includes providing an electrical current through one or more of the plurality of heating zones.

20. The method of claim 19, wherein providing an electrical current through one or more of the plurality of heating zones includes successively providing an electrical current through each of the heating zones from an outermost zone to an innermost zone.

21. The method of claim 19, wherein the surface comprises a portion of a rotor blade of a rotary aircraft, the method further comprising rotating the rotor blade simultaneously with the providing the electrical current through one or more of the plurality of heating zones.

* * * * *